Feb. 21, 1939.   R. BURNHAM   2,148,187
REVERSIBLE SEAT
Filed June 18, 1936   6 Sheets-Sheet 1

Inventor:
Raymond Burnham
By Dyrenforth, Lee, Chritton & Wiles
Attorneys

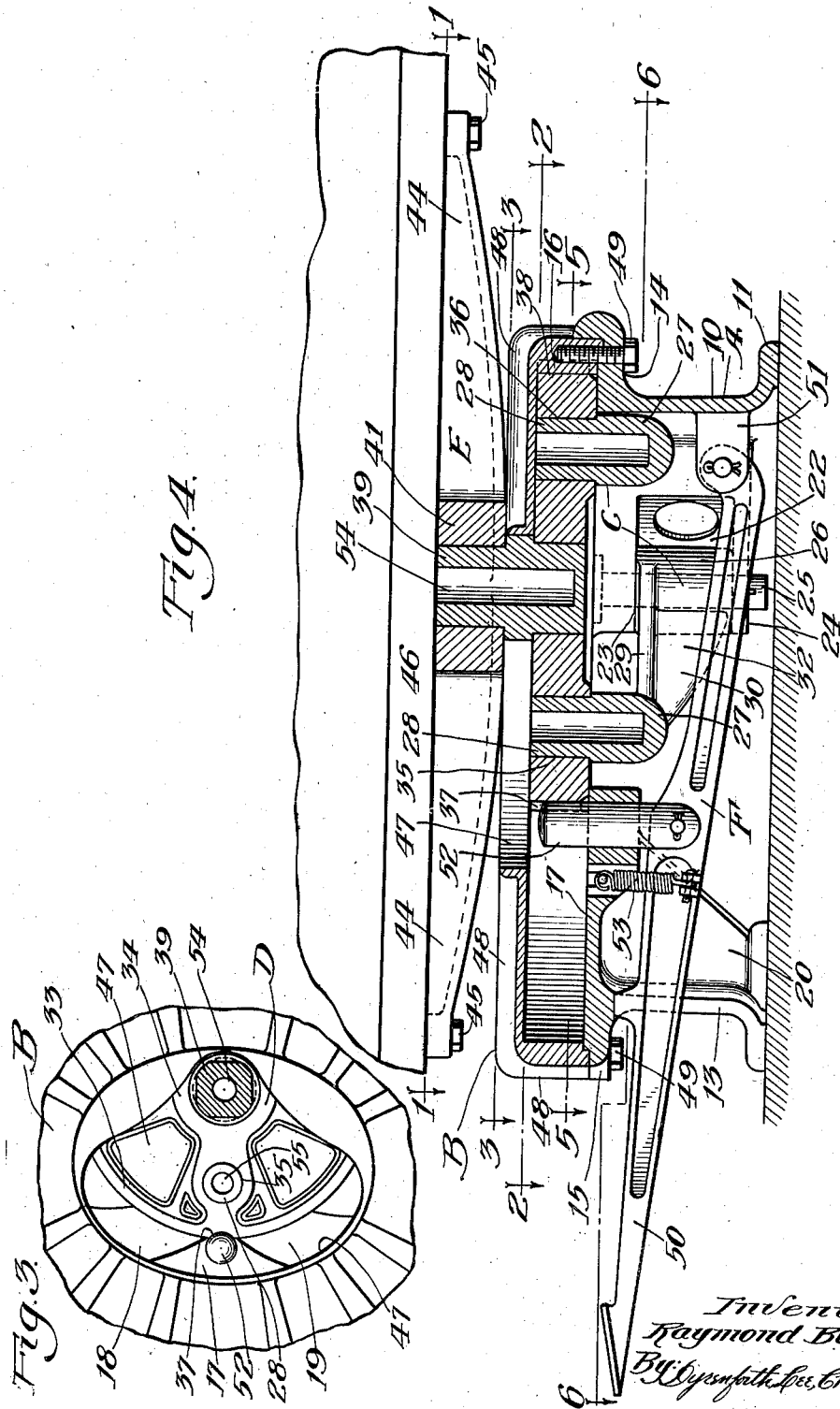

Feb. 21, 1939.　　　　　R. BURNHAM　　　　　2,148,187
REVERSIBLE SEAT
Filed June 18, 1936
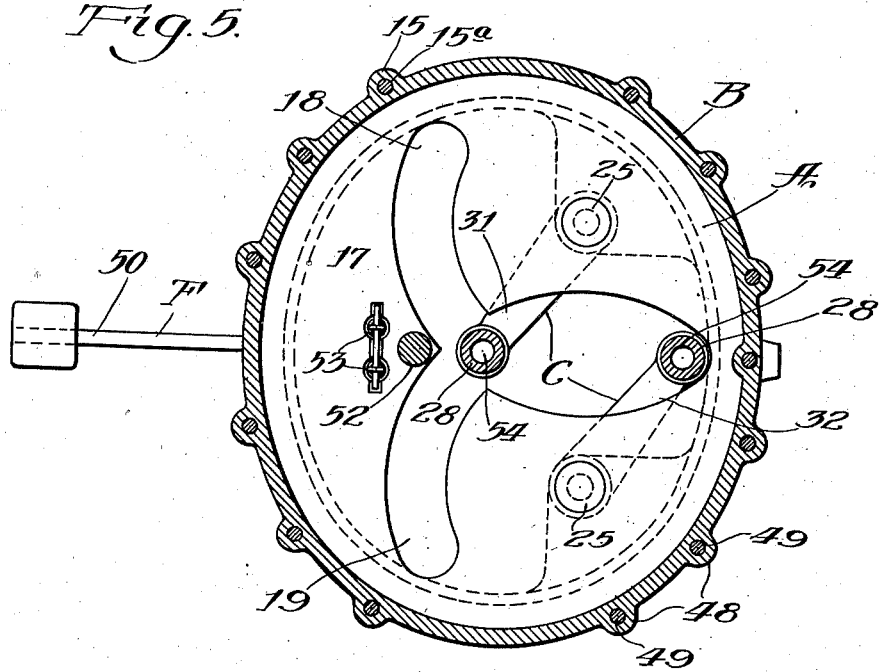
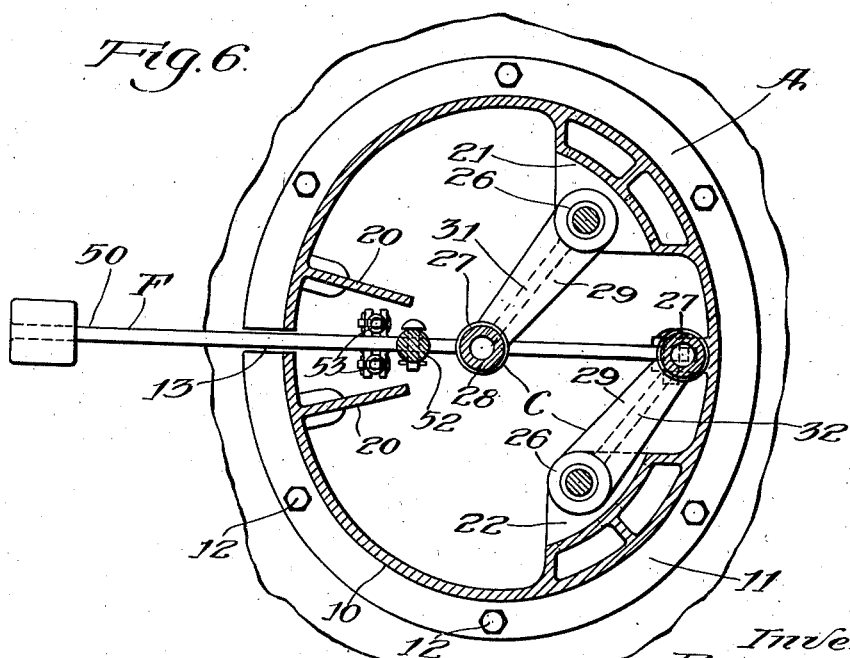

Feb. 21, 1939.　　　　　R. BURNHAM　　　　　2,148,187
REVERSIBLE SEAT
Filed June 18, 1936　　　　6 Sheets-Sheet 4

Inventor:
Raymond Burnham,
By Dyrenforth, Lee, Chritton & Wiles
Attorneys.

Feb. 21, 1939.   R. BURNHAM   2,148,187
REVERSIBLE SEAT
Filed June 18, 1936   6 Sheets-Sheet 5
Fig.8.
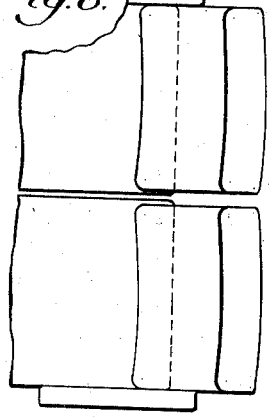
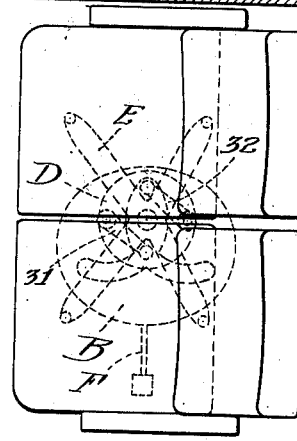
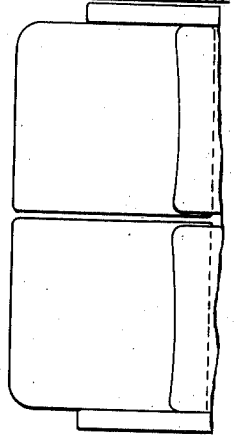
Fig.9.
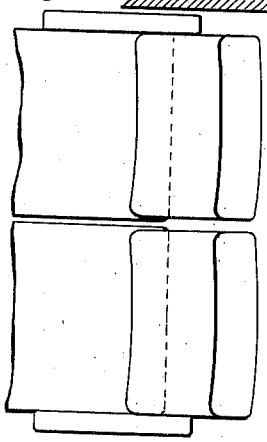
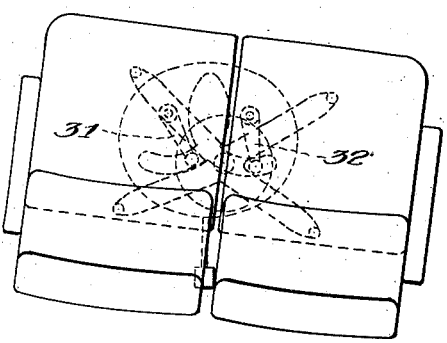
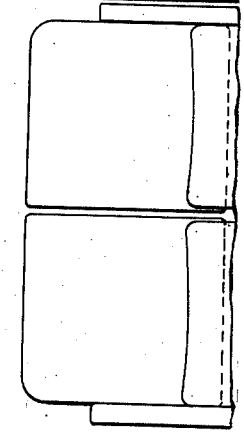
Fig.10.
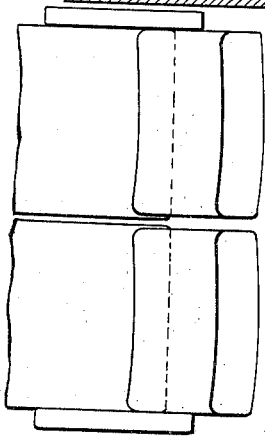
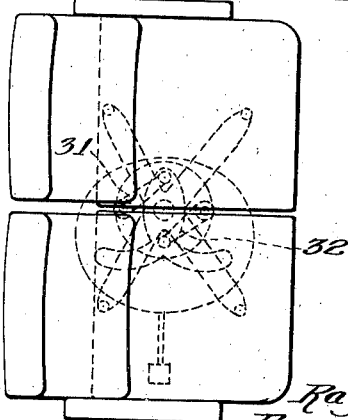
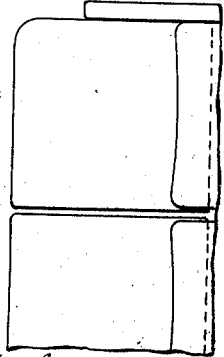
Inventor:
Raymond Burnham.
By Dyrenforth, Lee, Chritton & Wiles
Attorneys Patented Feb. 21, 1939

2,148,187

UNITED STATES PATENT OFFICE 2,148,187

REVERSIBLE SEAT

Raymond Burnham, Chicago, Ill., assignor, by mesne assignments, to S. Karpen & Bros., a corporation of Illinois Application June 18, 1936, Serial No. 85,987

7 Claims. (Cl. 155—96)

This invention relates to a reversible seat particularly adapted for use in railway coaches and busses, but the invention may be usefully employed elsewhere.

An object of the invention is to provide an improved seat of sturdy construction which can be readily reversed in direction and which will be laterally shifted during such reversal. Another object is to provide a reversible seat construction which operates with a minimum of friction but yet which prevents tilting or rocking of a chair or seat member upon its pivotal connections with the base members.

A further object is to provide a reversible seat structure in which the moving parts are enclosed within a casing member where they are free from dust and cannot harm or soil a passenger's clothes.

Figure 1:
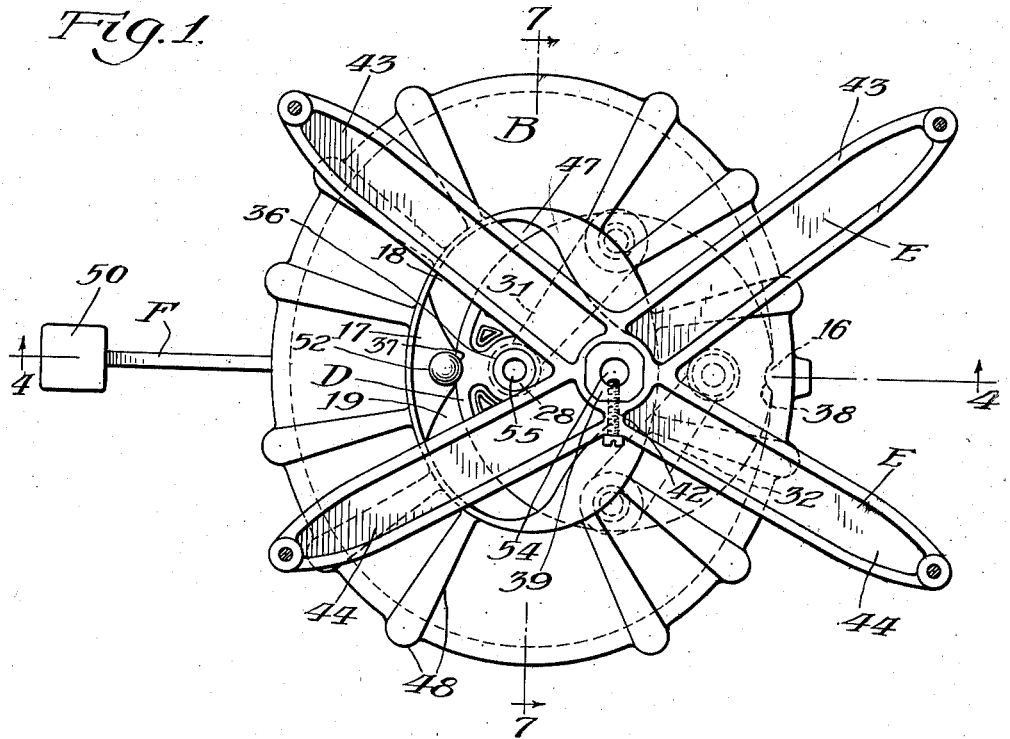
Figure 2:
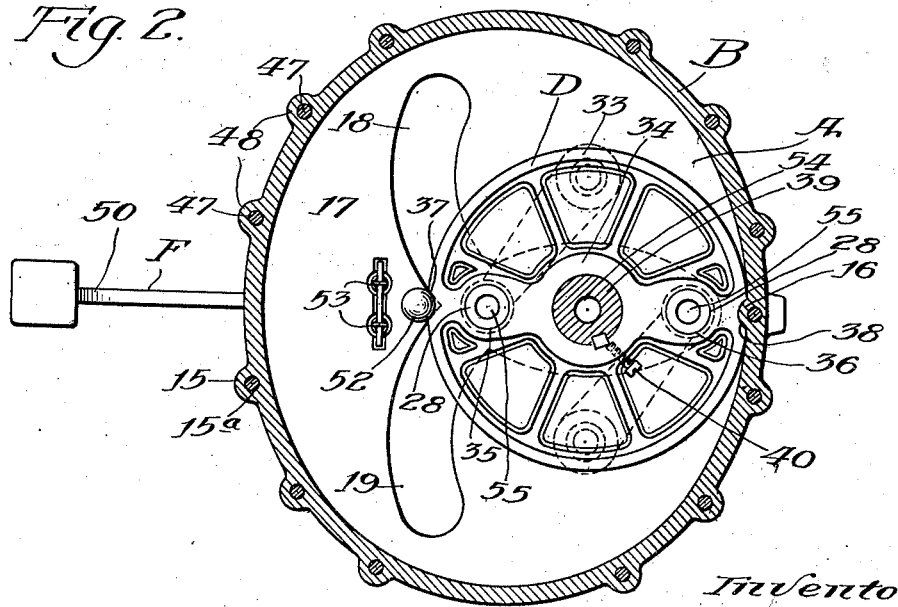
Figure 7:
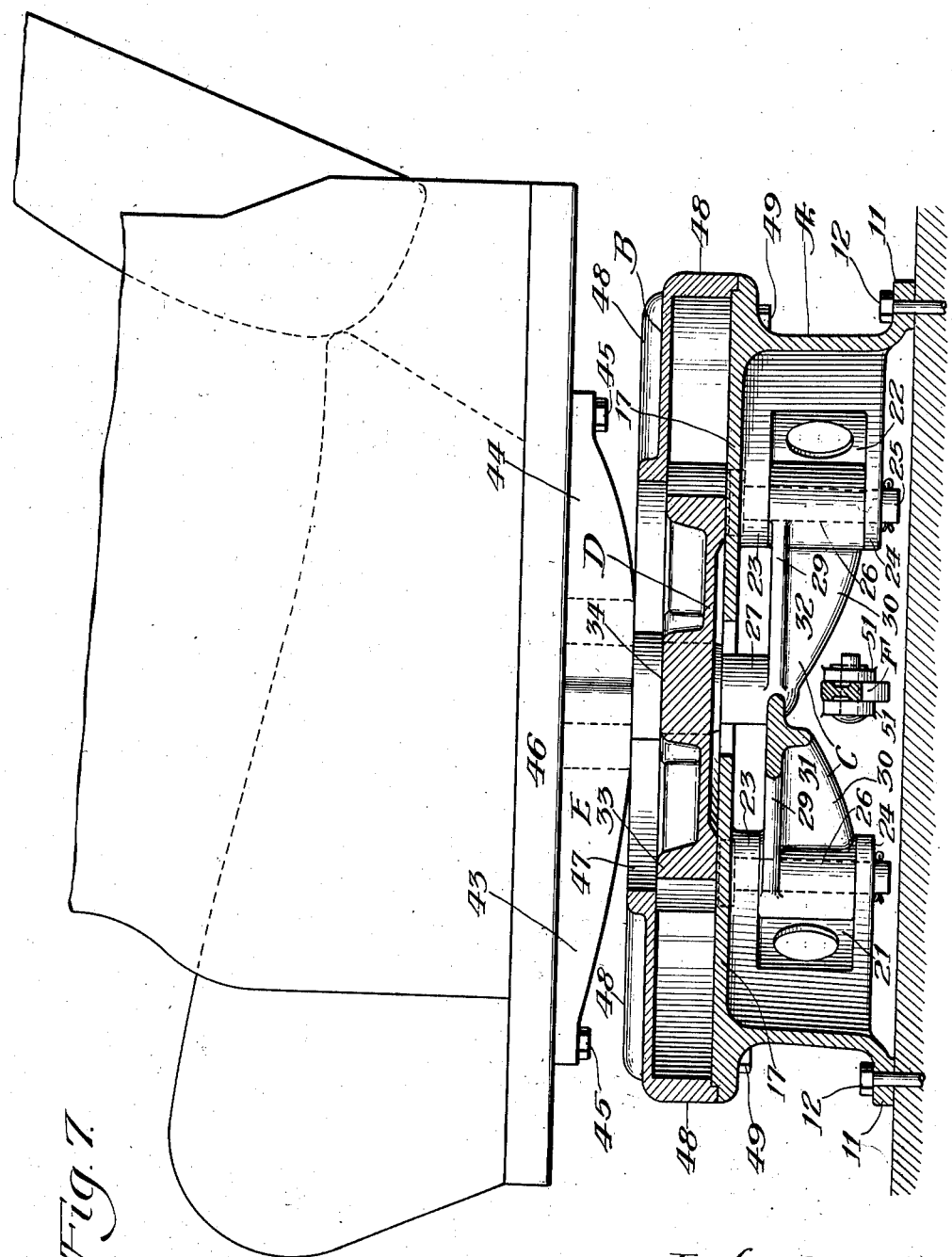
Figure 11:
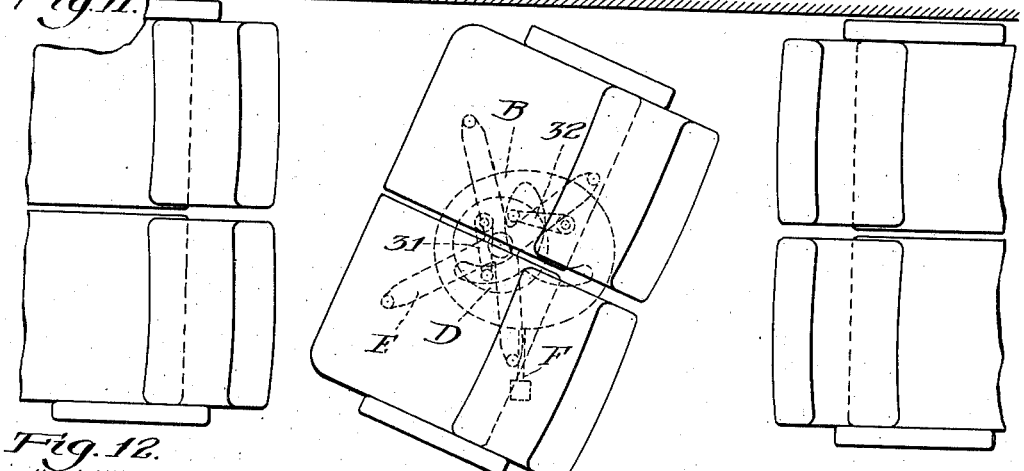
Figure 12:
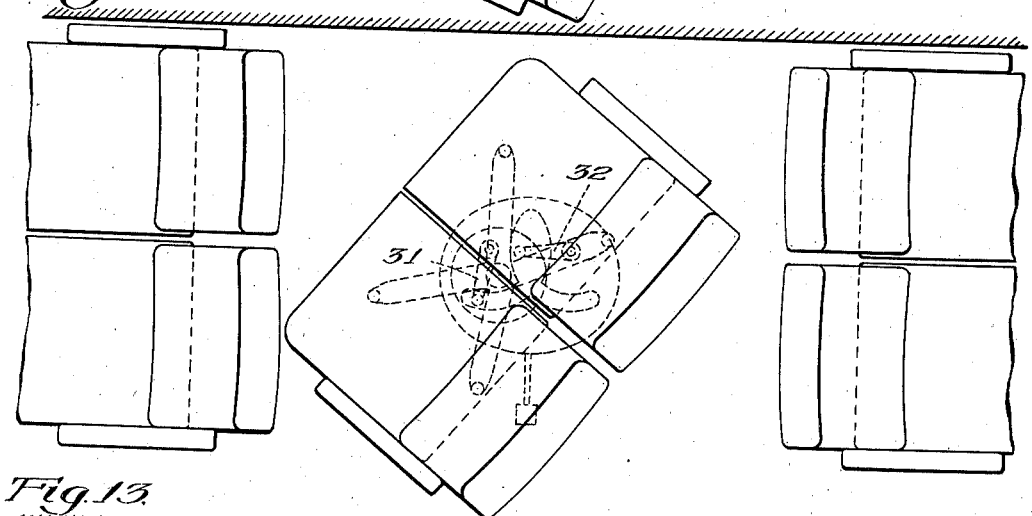

The invention is illustrated in a preferred embodiment in the accompanying drawings, in which:

Fig. 1 is a sectional view taken along line 1—1 of Fig. 4, showing the seat supporting structure and its mounting; Fig. 2, a sectional view taken on line 2—2 of Fig. 4, and showing the disk in locked position; Fig. 3, a sectional view taken as indicated at line 3—3 of Fig. 4, showing the opening in the cover; Fig. 4, a sectional view in end elevation, the section being taken on line 4—4 of Fig. 1; Fig. 5, a sectional view taken on line 5—5 of Fig. 4, showing the movement of the arms in the slotted table at the beginning of reversal; Fig. 6, a sectional view taken on line 6—6 of Fig. 4, showing the arms and their mounting within the base; Fig. 7, a sectional view in side elevation, the section being taken on line 7—7 of Fig. 1; Fig. 8, a plan view of the seat as mounted between adjacent seats in a railway car or bus; Fig. 9, a plan view similar to Fig. 8, but showing the seat as it is being turned in reversal; Fig. 10, a plan view similar to Figs. 8 and 9, but showing the seat in reversed position; Fig. 11, a plan view similar to Fig. 8, but illustrating the lateral movement of the seat as it begins to revolve; Fig. 12, a plan view similar to Fig. 11, showing the position of the seat as its revolution approaches 45°; and Fig. 13, a view similar to Fig. 11, showing the position of the seat as its revolution approaches 90°.

In the embodiment illustrated A designates a base; B designates a cover attached to base A; C designates arms pivotally mounted on base A; D designates a plate or disk connected to arms C; E designates frame supporting structure by which a chair or seat is secured to plate D; and F designates locking mechanism.

The base A comprises the annular closed wall 10 having a cross section of general elliptical shape. At the bottom edge of wall 10 is the outward flange 11 which is provided with bolts 12 for attaching the base to a floor or other structure. A vertical slot 13 extends through wall 10 and flange 11 and provides an opening through which a foot treadle may extend. At the top of wall 10 is the external flange 14 which is provided with ears 15 containing bolt holes 15a, and at the extreme right of the inside of wall 10 is the vertical ridge 16 which cooperates with the locking mechanism.

Across the top of base A extends the plate or table 17. As shown more clearly by Fig. 5, this table is provided with two arcuate slots 18 and 19, which have overlapping portions. The radii and centers of the arcs described by these slots correspond respectively with the length of arms C and the points about which arms C are pivoted. Slots 18 and 19 overlap at their right hand portions as shown in Fig. 5, and have their ends extending to the inside of wall 10. Table 17 has also openings permitting the passage of a locking bolt and for fastening a treadle spring.

Base A has on its interior the two brackets 20 which extend from the table to the bottom of the base and serve to strengthen the base particularly about the locking mechanism. At opposite ends of the base and in a position as shown in Fig. 6, are the front and rear arm supports 21 and 22. These supports are of sturdy construction and are composed of framework adequate to maintain arms C in proper position though under heavy strain.

Supports 21 and 22 are provided with upper and lower bearing edges 23 and 24 which are adapted to receive the hub of arms C between them. The upper edges 23 are formed integral with table 17. Pivot bolts 25 extend downward through table 17, through bearing edges 23, and through lower bearing edges 24 to provide pivoted mountings for arms C. The lower ends of bolts 25 may be flattened and fitted through corresponding openings in edges 24 to prevent them from pivoting with arms C.

Arms C are identical in form and size. Each is provided with a base hub 26 and an arm end 27 which is provided at its top with an upright cylindrical stud 28 having a reduced diameter at its top portion. The shank connecting the end 27 with the hub 26 has a top horizontal rib 29 and a deep vertical rib 30 which contributes greatly to the strength of the arms. One of the arms, designated by numeral 31, is mounted on front support 21, the hub 26 extending between bearing edges 23 and 24 and engaged by pivot bolt 25. The other arm, designated by numeral 32, is similarly mounted in rear support 22. When the arms are thus mounted, the studs 28 extend upwardly through slots 18 and 19 of table 17. The length of the arms and radii of the arcuate slots may be as desired; except that the effective length of each arm, or the distance between the center of hub 26 to the center of stud 28, must be more than one half and less than the total distance between the centers of hubs 26.

The disk D, shown more clearly in Fig. 2, is preferably in the shape of a wheel having a rim 33 and hub 34. Near opposite edges of disk D are bearings 35 and 36 adapted to receive the top or reduced portion of studs 28. These bearings should be sufficiently separated that when mounted on the arms each bearing is the same distance from the center of either arm hub 26. At opposite edges of the disk and along the same diameter as bearings 35 and 36 are the rounded grooves 37 and 38. These grooves cooperate with the locking means later to be described. In the center of the disk an upright shaft 39 is secured in hub 34 by a key and screw 40. Portions of the disk about the shaft and bearings are reinforced to withstand the force of heavy weight on the shaft. When mounted the disk is immediately above table 17 and rests upon the ends of arms C, the studs 28 of the arms being received within bearings 35 and 36.

The top end of shaft 39 is secured to the hub 41 of the frame supporting structure E. To firmly secure the shaft its end may be of polygonal cross section and fitted in a corresponding opening in hub 41. A set screw 42 lends additional security.

Structure E includes also front arms 43 extending forwardly and diagonally to each side, and rear arms 44 extending rearwardly and diagonally to each side. Each of arms 43 and 44 are channeled, their bottoms being inclined upwardly toward their ends and their top edges even with and in a single plane with the top of hub 41 and shaft 39; and each of the arms have apertured ends to accommodate screws or bolts 45 for attaching a seat frame 46.

The cover B is adapted to fit about the edges of base A and enclose the disk D. In the assembly of parts this cover must be attached after the disk D has been mounted but before the frame supporting structure E has been attached. An opening 47 in the cover, of a shape as shown in Fig. 3, is provided to accommodate the movements of the vertical shaft 39. Top and side ribs 48 serve to lend strength and relieve excessive weight of the cover. At their lower edges ribs 48 are tapped and bolts 49 extending upwardly through bolt holes 15a in flange 14 secure cover B to the base.

When the seat is fully assembled the disk D rests upon arms C, the top edge of its rim 33 is even with the lower surface of cover B, and the lower edge of rim 33 is even with the top of table 17 of the base; and the seat supporting structure E is immediately above the top edge of cover B.

The locking mechanism F comprises a foot treadle 50 extending through slot 13 and pivotally mounted at its end in ears 51 formed integral with wall 10. A locking bolt 52 has its lower end pivotally attached to treadle 50 and extends upwardly through the opening in table 17 and engages groove 37 in disk C. A spring 53, having one end attached to treadle 50 and the other end secured in table 17, normally keeps the treadle in raised position and bolt 52 in engagement with one of the grooves in disk D.

The seat may be made of any desired materials but preferably is constructed mainly of a cast aluminum alloy because of the light weight and great strength of this material. The bearings, bolts, pins, etc. may be of steel or other conventional materials. In order to reduce weight wherever possible the shaft ends may be hollowed where there is no great strain. For instance, shaft 39 contains a central bore 54, and the ends of arms 31 and 32 contain central bores 55.

*Operation*

Fig. 8 shows the normal or usual position of my improved seat while it is in use. The position of the various parts here shown is the same as appears in each of Figs. 1 to 7. Arms 31 and 32 are parallel and ends 27 are aligned with a transverse axis of the base. Disk D is held secure at one edge by the ridge 16 in groove 38 and is secured at the opposite edge by the locking bolt 50 in groove 37.

When a passenger wishes to reverse the seat he presses treadle 50 which serves to withdraw locking bolt 52. Disk D is then free to move laterally to the left and in clockwise rotation, the arm ends starting to move in the directions indicated by arrows in Fig. 5, arm 31 moving in clockwise direction and arm 32 in counter-clockwise direction. The beginning movement carries away the chair quickly from the wall of a car almost as the chair begins to rotate, as illustrated by Fig. 11. This movement gives ample clearance for the corner of the chair as it passes the side of the car, as shown in Fig. 12.

Figure 13:
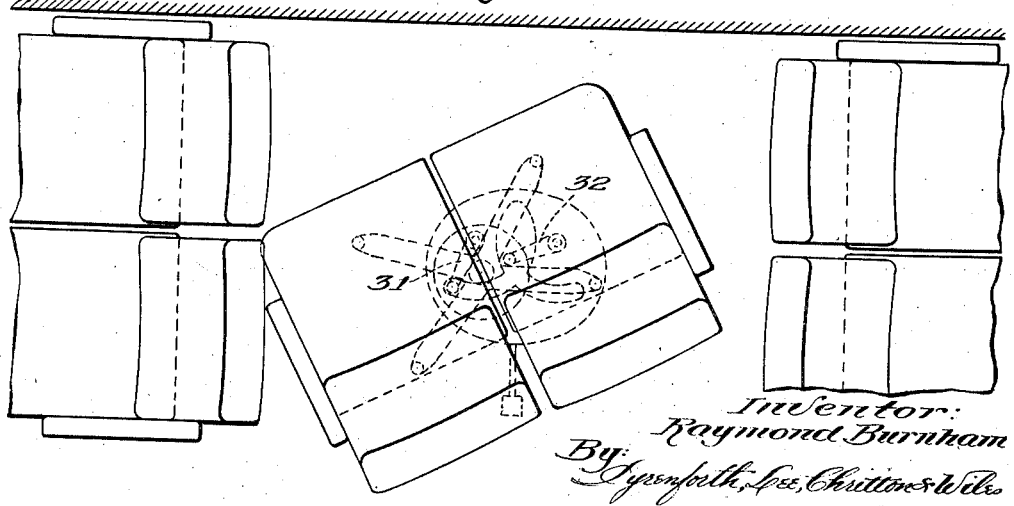

After the chair has revolved almost one quarter revolution the arm 32 becomes aligned with the hub of arm 31. This position is shown by Fig. 13. Further turning of the chair causes arm 32 to continue counterclockwise movement and arm 31 to reverse direction beginning counterclockwise movement. Fig. 9 shows arm 31 approaching alignment with the hub of arm 32. When this alignment is reached, arm 31 continues counterclockwise movement while arm 32 reverses and begins clockwise movement. This motion continues until the seat is completely reversed and the end has moved laterally back towards the side of the car. This position is shown in Fig. 10. Disk D, being in position reversed from normal, is engaged by ridge 16 in groove 37 and by the locking bolt 52 in groove 38, the locking bolt having moved upwardly as soon as the groove came into alignment.

When it is desired to turn the seat back to normal position again, the treadle 50 is depressed as before, and movements take place as described above except for being reversed in direction and sequence.

In my improved construction the weight of the chair is borne by the arms C, and friction between moving parts is confined mainly to small areas at the ends of the arms where relative motion between frictional parts is greatly reduced. Such construction allows much easier operation than other devices in which the weight of the chair is borne by a flat surface.

Firmness and security are obtained by provision of a table below the disk and a cover above it. If the weight of the chair becomes unbalanced, or if for any reason the chair is inclined to tilt as it is being reversed, the table bears against the bottom at one edge and the cover bears against the top at an opposite edge to maintain the disk in an even plane throughout its movement. The use of either the table or the cover, alone, tends to produce this result, but I have found that by the use of both these expedients the disk is more firmly and evenly guided and there is less chance of objectionable vibration.

A further advantage of the cover is that it encloses moving parts and prevents injury to a passenger's clothes. Frictional parts should be well oiled for smooth operation and if these are to be exposed there is great danger of clothing being brushed against an oiled member and the clothing ruined. In providing the cover not only is the person and apparel of the passenger protected, but a neater and more pleasing appearance is obtained.

While in the foregoing description, I have set forth a specific structure as illustrative of my invention, it will be understood that many changes may be made in the shape or form of the construction without departing from the spirit of my invention.

The foregoing detailed description has been given for clearness of understanding only, and no unnecessary limitations should be understood therefrom, but the appended claims should be construed as broadly as permissible, in view of the prior art.

I claim:

1. A reversible seat comprising: a base; a pair of arms pivotally supported by said base; a disk pivotally supported on said arms, said disk being rotatable and movable in a lateral direction; a cover over said disk and secured to the top of said base, said cover having an opening at its top; and means extending through said opening for fixedly securing a seat to said disk, the periphery of said opening being of substantially the same form as the path of movement of said means.

2. A reversible seat comprising: a base; a pair of arms pivotally supported by said base; a disk pivotally supported on said arms, said disk being rotatable and movable in a lateral direction; a cover secured to the top of said base and having an opening in its top, said cover being immediately above said disk and adapted to bear against said disk to prevent tilting thereof; and means for fixedly supporting a seat upon said disk.

3. A reversible seat comprising: a base providing a table on the top thereof; a pair of arms pivotally supported by said base; a disk above and adjacent said table and pivotally supported by said arms, said disk being movable laterally and rotatable with respect to said base; a cover secured to the top of said base and having an opening in its top, said table and said cover adapted to guide said disk in its movements with respect to said base; and means for fixedly supporting a seat upon said disk.

4. A reversible seat comprising: a base; a pair of arms pivotally supported by said base; a disk pivotally supported by said arms and containing grooves at opposite points in its peripheral edge, said disk being rotatable and movable in a lateral direction; means associated with said base for preventing tilting of said disk with respect to said base; releasable locking means for engaging said grooves whereby said disk is locked against movement with respect to said base.

5. A reversible seat comprising: a base; a pair of arms pivotally supported by said base; a disk pivotally supported by said arms and containing a pair of grooves at opposite points in its peripheral edge, said disk being rotatable and movable in a lateral direction; means associated with said base for preventing tilting of said disk with respect to said base; releasable locking means including a lever pivotally connected at one end to said casing and equipped with a locking bolt adapted to engage one of said grooves, and a ridge on said base adapted to engage the other of said grooves, said locking means being effective to secure said disk at opposite edges against movement with respect to said base; and means for fixedly supporting a seat upon said disk.

6. A reversible seat comprising: a base providing a table on the top thereof, said table having arcuate slots; a pair of arms pivotally supported by said base beneath said table, said arms being equipped with studs extending through said arcuate slots, said studs being adapted to move in said slots as said arms move about their pivots; a disk above said table and rotatably supported by said arms, said disk being provided with grooves in opposite edges; a cover secured to the top of said base and having an opening in its top, said table and said cover being adapted to guide said disk in its movements with respect to said base; locking means for engaging said grooves at positions of the disk one half revolution apart to prevent movement of said disk with respect to said base; and means for fixedly supporting a seat upon said disk.

7. A reversible seat comprising: a base providing a table on the top thereof; a pair of arms pivotally supported by said base, said arms having top horizontal ribs and deep vertical ribs below said horizontal ribs; a disk above said table and pivotally supported by said arms, said disk being movable laterally and rotatable with respect to said base; a cover having an opening in its top and equipped with ribs extending on its top and over its edges, said cover being attached to said base by bolts extending into the ribs on said cover; and means for fixedly supporting a seat upon said disk.

RAYMOND BURNHAM.